2,825,655

PROCESS FOR STABILIZING POLYSACCHARIDE XANTHATES AND PRODUCTS

Geoffrey W. Meadows, Kennett Square, Pa., assignor to E. I. du Pont de Nemours and Company, Wilmington, Del., a corporation of Delaware No Drawing. Application June 29, 1955
Serial No. 518,935

11 Claims. (Cl. 106—164)

This invention relates to methods for improving the stability of water soluble xanthates of polysaccharides and to the resulting stabilized compositions.

Xanthates of polysaccharides, as usually prepared, are unstable and on aging rapidly loose xanthate groups resulting in a degraded product which is water insoluble. This characteristic of the products greatly limits their use. For practical purposes, the use of such products is restricted to the location of their manufacture.

It has heretofore been suggested that the spontaneous and progressive decomposition of xanthates of polysaccharides is caused at least in large measure by hydrolysis. Accordingly, attempts have been made to remove the water from freshly prepared product by usual drying methods such as heating in a vacuum or drying in a stream of warm air. The difficulty with these methods is that as one attempts to remove all water by applying heat, he causes loss of xanthate groups from the polymer with the result that he ends up with a dry material which is no longer water soluble.

One can reduce the water content of freshly prepared water soluble xanthates of polysaccharides down to about 2.5% to 10% by weight using the conventional vacuum drying or warm air stream drying techniques without serious loss of water solubility. Such dried product, however, decomposes relatively rapidly upon aging. I have now discovered a method for stabilizing water soluble xanthates of polysaccharides containing less than about 10% water by weight so that water solubility of such materials is retained under the usual commercial shipping, storing, and marketing conditions. According to the present invention, the xanthate to be stabilized is admixed with a pulverulent solid desiccant material of a kind more specifically described hereinafter.

The xanthates used in the composition and methods of the invention are those prepared from a polysaccharide which is selected from the group consisting of pentosans and hexosans. Such xanthates will be referred to hereinafter more briefly as polysaccharide xanthates. The polysaccharide xanthates are conveniently prepared by soaking the polysaccharide in an alkali and then treating the alkali polysaccharide which is formed with carbon disulfide. The method is especially well known with reference to one hexosan, namely, cellulose since it is used to prepare cellulose xanthate in processes for the manufacture of viscose rayon fiber and cellophane. Thus, cellulose xanthate salts such as the sodium or potassium salts are made according to such methods, for example, by treating pulped, shredded, or otherwise finely divided cellulose with strong sodium or potassium hydroxide solution and the resulting material is then treated with carbon disulfide. The method and the details of the chemistry involved are fully described in Heuser, "The Chemistry of Cellulose," chapter 8 (John Wiley and Sons, 1944).

The polysaccharide xanthates employed in the processes and compositions of this invention are conveniently represented by the formula $$[C_nH_{2n-2-m}O_{n-1}(CSSA)_m]_x$$

where $n$ is 5 or 6; $m$, the degree of xanthation, is from 0.3 to 3.0, and more preferably from 0.6 to 1.0; $x$, the degree of polymerization, is at least 50 and preferably greater than 200; and A is a metal or other salt-forming group.

Illustrative of the polysaccharide xanthates useful in the methods and compositions of this invention are those obtained by xanthation of cellulose, starches, dextrins, hemi-celluloses, pectins, dextrans, levans, laminarons, agars and xylans. The xanthates can be prepared from these polysaccharides of commerce or more economically they can be prepared by direct xanthation of crudes such as wood pulp, cotton linters, saw dust, corn cobs, seed hulls, straw, sea weed, fruit pulp, sugar beet pulp, bagasse waste paper, rags, potatoes, wheat, rice and corn.

The degree of xanthation and the degree of polymerization represented by $m$ and $x$ respectively in the above formula are determined according to the procedures described in Dorée, "The Methods of Cellulose Chemistry" (Chapmann and Hall, London, 1947).

While the degree of xanthation can be varied widely within the range of about 0.3 to 3.0 xanthate groups per polysaccharide unit, it will be appreciated by those skilled in the art that degrees of xanthation greater than 1.0 are more difficult to obtain and special procedures such as those described by Lieser and Leckzyck, Ann. 522, 56 (1936), and Geiger and Weiss, Helv. Chim. Acta 36, 2009 (1953), can be utilized. It is for this reason that it is preferred to use polysaccharide xanthates having a degree of xanthation less than about 1.0 and more preferably from about 0.6 to 1.0.

The salt-forming group, A, in the formula above, is preferably sodium or potassium. It will be understood, however, that A can be varied widely; it can, for example, be other monovalent cations such as lithium, ammonium, tetramethylammonium, and other quaternary ammonium ions. Polyvalent cationic radicals can also be used, for example, magnesium, calcium, strontium, iron, zinc, aluminum, copper, and other metals.

The term "desiccant" is used herein in the conventional sense to describe a drying agent, that is, a material whose affinity for water is so great that it will extract water from other materials with which it comes into contact. Desiccants can, for instance, be deliquescent materials or substances on which the water is held by Van der Waal's or capillary forces or which undergo chemical combination with water.

The desiccants employed in the compositions and methods of the invention are further characterized as particulate solid non-acid (i. e., neutral or alkaline) desiccants. By the term "non-acid" as used to characterize the desiccant employed, I mean a material which when mixed with water according to the following simple test procedure provides an aqueous mass having a pH greater than about 5 at 22±3° C.:

To determine whether a solid particulate desiccant meets the non-acid requirement, one gram of the desiccant (anhydrous basis) is added to 100 ml. of distilled water. The resulting slurry or solution is then thoroughly mixed for two minutes in a high speed mixer of the kind currently marketed under the tradename "Waring Blendor." The pH is then immediately determined using a Beckman pH meter with a glass electrode.

There follows a tabulation of the pH obtained according to the above test procedure with a number of solid desiccants illustrative of the desiccant materials useful in the compositions and methods of the invention. In addition to the temperature and the pH, there is shown in the tabulation under the heading "elapsed time" the number of seconds elapsed from the end of the stirring operation until the pH reading became substantially constant.

TABLE

| Stabilizer | Temp., ° C. | Elapsed Time, sec. | pH |
| --- | --- | --- | --- |
| Barium Oxide | 22 | 30 | 12.80 |
| Calcium Oxide | 20 | 55 | 12.70 |
| Potassium Carbonate | 21 | 30 | 10.80 |
| Magnesium Oxide | 21 | 55 | 10.61 |
| Calcium Sulfate (2 $H_2O_3$) | 21 | 45 | 6.30 |
| Calcium Chloride | 21.5 | 30 | 6.30 |
| Sodium Sulfate | 21 | 30 | 6.28 |
| Magnesium Chloride (6 $H_2O$) | 21 | 30 | 5.82 |
| Calcium Bromide (2 $H_2O$) | 22 | 30 | 6.11 |
| Bentonite | 20 | 40 | 8.70 |
| Kaolin (Unbleached) | 20 | 55 | 5.71 |
| Attapulgite | 19 | 60 | 6.71 |
| Diatomaceous Earth | 21 | 60 | 7.00 |
| Activated Alumina (48-100 mesh) | 23 | 60 | 8.90 |
| Silica Gel | 21 | 60 | 6.11 |
| Sodium Zeolite (Synthetic Sodium Zeolite) | 23.5 | 30 | 10.32 |
| Calcium Zeolite (Synthetic Calcium Zeolite) | 21.5 | 45 | 9.20 |

Illustrative of solid particulate non-acid desiccants useful in the compositions and methods of the invention are inorganic oxides such as those of barium, calcium, and magnesium; anyhydrous inorganic salts such as potassium carbonate, sodium carbonate, sodium sulfate, calcium sulfate, calcium chloride, calcium bromide, magnesium perchlorate, sodium carbonate, barium perchlorate, magnesium chloride; dehydrated zeolites, natural or synthetic; clays such as dehydrated bentonite, dehydrated kaolinite, dehydrated attapulgite; finely divided activated materials of high total surface area such as charcoal, carbon, diatomaceous earth, asbestos, alumina, silica; and organic drying materials.

Preferred desiccants are those which, when having a water content less than about 3% by weight, have a lower partial vapor pressure of water above them than does the xanthate at the same water content. Illustrative of such preferred materials are the alkaline earth metal oxides (e. g., barium oxide, calcium oxide, and magnesium oxide), potassium carbonate, dehydrated attapulgite, alumina, silica gel, and natural or synthetic zeolites.

Still more preferred desiccants are those which have a partial vapor pressure of water of less than 1.0 mm. at 25° C. after taking up 10% of their own weight of water. Examples of this most preferred class are barium oxide, calcium oxide, and zeolites, natural or synthetic. Dehydrated zeolites have been referred to in recent years as molecular sieves because of their selective sorptive capacity toward certain types of molecules. Synthetic zeolites are commercially available in particulate crystalline form having quite uniform interstices or pores of molecular dimensions.

It will be appreciated that certain solid desiccant materials are water soluble and others are not and, accordingly, the choice of a desiccant will in part be governed by the solubility properties desired in the finished composition. Thus, if a completely water soluble composition is desired for use in the form of a solution, a water soluble desiccant such as sodium or potassium carbonate is used. On the other hand, if the composition is intended for use in dry form, a water insoluble desiccant can be used.

The term water soluble or water solubility as used herein to describe a material means that at least two grams of the material dissolves in one hundred grams of water at 25° C.

The water soluble polysaccharide xanthates used in preparing the compositions of the invention should have a moisture content less than about 10% by weight. Such polysaccharide xanthates containing from about 2.5% to 10% by weight of water are readily obtained as mentioned heretofore by drying freshly prepared water soluble polysaccharide xanthate in a vacuum oven or in a circulating air oven. In any such heating operation, the temperature should be kept below about 70° C. It will be understood, of course, that a water soluble polysaccharide containing less than 2.5% water can also be used if desired but the preparation of such low water content material requires additional operations and it is not necessary to have such lower water content in order to obtain the benefits of the present invention.

The admixing of the polysaccharide xanthate with the solid desiccant can be carried out in any convenient manner. Best results are obtained by carrying out the mixing operation in the absence of moisture or a moist atmosphere and at a temperature below about 40° C. The xanthate in powdered form can be blended with powdered desiccant in mechanical apparatus or alternatively the xanthate in the form of crumb or ribbon can be mixed with the desiccant and the mixture powdered to the required particle size. Optionally, other ingredients, diluents or carriers, and conditioning agents such as surface-active wetting, dispersing, or emulsifying agents can be included in the compositions. The compositions of the invention are preferably stored in closed moisture proof containers.

The amount of desiccant employed in the methods and compositions of the invention can be varied rather widely, the minimum amount depending, of course, upon the relative desiccant action of the material used, the water content of the polysaccharide xanthate at the time of mixing and the period and temperature of storage for which protection is required. In general, the desiccant will be present in amount corresponding to at least 5% by weight of the polysaccharide xanthate. More preferably, the desiccant will be present in amount corresponding to at least 15% or more by weight of the polysaccharide xanthate, i. e., at least fifteen pounds of the desiccant for each one hundred pounds of the polysaccharide xanthate.

In a preferred embodiment of the invention, the polysaccharide xanthate used is cellulose xanthate, and more preferably, cellulose xanthate which has been prepared from a fairly pure form of cellulose such as cotton linters or wood pulp. The moist xanthate crumb produced is then dried in a vacuum oven or in a rapidly circulating air oven at a temperature below 70° C. until the water content of the xanthate is within the range of about 2.5 to 10% by weight.

All mention of water content values made in this patent specification and the claims thereof refer to water content as determined by the standard toluene-moisture method of Bidwell-Stirling described in Scott's "Standard Methods of Analysis," 5th edition, vol. 2, page 1342 (Van Nostrand, 1939).

The water soluble compositions of the invention are useful in general in the processes for which ordinary xanthate or viscose are used. Furthermore, they are especially useful in novel applications such as in soil conditioning for agricultural purposes, erosion control, and in the stabilization of soil for engineering constructional purposes. The compositions of the invention containing a water insoluble desiccant are also useful in the latter novel applications and in other uses where the presence of an insoluble diluent is not harmful.

In order that the invention may be better understood, the following examples are given in addition to the examples already given above.

*Example 1*

610 parts by weight of cotton linters having a degree of polymerization of about 1800 are steeped for 30 minutes in 10,000 parts by weight of an 18% solution of sodium hydroxide in water. The resulting alkali cellulose is then pressed to a weight ratio of 3:1 based on the original cotton linters, shredded, and carbon disulfide is added in amount corresponding to 73% by weight based on the original cotton linters.

Following addition of the carbon disulfide, the reacting mass is agitated for about 6 hours while maintaining a temperature approximately 25° C. The cellulose xanthate crumbs obtained in this manner are pre-dried by heating in an air circulating oven at about 70° C. for 70 minutes, and the resulting material is ground in a hammer mill in an atmosphere of dry nitrogen. The resulting product referred to hereinafter for convenience merely as oven dried cellulose xanthate contains 5.7% by weight water.

50 parts by weight of the oven dried cellulose xanthate are mixed with 50 parts by weight of anhydrous potassium carbonate. The mixture is ground in a hammer mill in an atmosphere of dry nitrogen and then is further blending by rolling in a horizontal cylindrical vessel. The resulting composition of the invention will be referred to hereinafter for convenience as the composition of Example 1.

The extent to which cellulose xanthate deteriorates on aging is indicated by its action in aggregating soil particles. There follows a comparison of the soil aggregating properties of the composition of Example 1 with the oven dried cellulose xanthate described in that example.

The soil used in the comparison is a silt loam sub-soil obtained from Newark, Delaware. By physical analysis, the soil is found to contain 26% sand, 50% silt, and 18% clay. By chemical analysis, it is found to have an organic content of 4.5% and a nitrogen content of 0.11%. Reference below to parts by weight of soil means parts by weight on a dry basis.

The cellulose xanthate to be evaluated is mixed with the soil in the proportions of 0.06 part by weight of the cellulose xanthate per 100 parts by weight of soil. Sufficient moisture is added to permit the soil to be worked into a paste-like mass. After allowing to age for about one hour, the soil is pressed into crumb-like particles which are dried in an air oven at 45° C. The stability of these soil aggregates toward the disruptive and slaking action of water is then determined using the standard "wet sieve" procedure disclosed in Bryant et al., "Measurement of water stability of soils," Soil Science, 65, 341–5 (1948).

In the wet sieve test, the dried soil aggregates are screened using a 3 mm. round hole screen to remove fine dust; a 25 gram sample of the dried soil aggregates retained on the 3 mm. screen is then charged into a 10 mesh U. S. Bureau of Standards Series sieve, which is placed on top of a 35 mesh sieve. The two sieves are fastened together and the soil aggregates are soaked in the water for a period of one minute. The sieves are then mechanically raised and lowered in the bath thru a stroke length of ¾", 35 times a minute, for two minutes. The soil remaining on the sieves is then dried and weighed and the weight retained is expressed as a percentage of the original soil aggregates charged into the 10-mesh sieve.

Evaluation of the composition of Example 1 and of oven dried cellulose xanthate according to the foregoing procedure shows that each material when used in freshly prepared form causes 99% of the soil treated to be retained on the sieves. However, after ageing the cellulose xanthate compositions for 65 days at 25° C. before conducting the soil aggregation evaluations, the effectiveness is greatly varied. Thus using the composition of Example 1 which has been aged for 65 days at 25° C. in a sealed container, there is retained on the sieves 99% of the amount originally charged. In contrast, using oven dried cellulose xanthate aged for the same period under the same conditions, only 42% of the soil charged to the sieves is retained. Untreated soil tested by the above method shows a retention of only 6% of the soil on the sieves.

*Example 2*

50 parts by weight of oven dried cellulose xanthate and 50 parts by weight of anhydrous calcium sulfate are blended and ground in a hammer mill following the procedure described in Example 1. Tested by the wet sieve method described in Example 1, the composition gives the following soil retention values: when freshly prepared, 99%; after 65 days' storage at 25° C. in a sealed container, 86%.

*Example 3*

50 parts by weight of oven dried cellulose xanthate powder are blended and ground in a hammer mill with 50 parts by weight of colloidal attapulgite which has been previously dried at 200° C. Tested by the wet sieve method described in Example 1, the composition gives the following soil retention values: when freshly prepared, 99%; after 65 days' storage at 25° C. in a sealed container, 99%.

*Example 4*

50 parts by weight of oven dried cellulose xanthate are blended and ground in a hammer mill with 50 parts by weight of silica gel which has previously been dried at 200° C. Tested by the weight sieve method of Example 1, the composition gives the following soil retention values: when freshly prepared, 99%; after 65 days' storage at 25° C. in a sealed container, 96%.

*Example 5*

50 parts by weight of oven dried cellulose xanthate are blended and ground in a hammer mill with 50 parts by weight of activated alumina which has previously been dried at 200° C. Tested by the wet sieve method of Example 1, this composition gives the following soil retention values: when freshly prepared, 99%; after 65 days' storage at 25° C. in a sealed container, 92%.

*Example 6*

50 parts by weight of oven dried, powdered cellulose xanthate are blended with 50 parts by weight of a crystalline sodium zeolite (a synthetic product marketed under the tradename of "Linde Molecular Sieve 4A") powder which has previously been dried at 500° C. Tested by the wet sieve method of Example 1, this composition gives the following soil retention values: when freshly prepared, 100%; after 42 days' storage at 45° C. in a sealed container, 92%. In contrast, unformulated oven dried cellulose xanthate after storage under the same conditions for 3 days, gives only 6% soil retention.

*Example 7*

50 parts by weight of oven dried, powdered cellulose xanthate are blended with 50 parts by weight of a crystalline calcium zeolite (a product marketed under the tradename "Linde Molecular Sieve 5A") powder which has previously been dried at 500° C. Tested by the wet sieve method of Example 1, this composition gives the following soil retention values: when freshly prepared, 100%; after 42 days' storage at 45° C. in a sealed container, 99%.

*Example 8*

50 parts by weight of oven dried, powdered cellulose xanthate are blended with 50 parts by weight of calcium oxide which has previously been dried at 500° C. Tested by the wet sieve method of Example 1, this composition gives the following soil retention values: when freshly prepared, 100%; after 35 days' storage at 45° C. in a sealed container, 97%.

*Example 9*

50 parts by weight of oven dried, powdered cellulose xanthate are blended with 50 parts by weight of magnesium oxide, which has reviously been dried at 500°

C. Tested by the wet sieve method of Example 1, this composition gives the following soil retention values: when freshly prepared, 99%; after 4 days' storage at 45° C. in a sealed container, 40%.

*Example 10*

50 parts by weight of oven dried, powdered cellulose xanthate are blended with 50 parts by weight of barium oxide which has previously been dried at 250° C. Tested by the wet sieve method of Example 1, this composition gives the following soil retention values: when freshly prepared, 100%; after 164 days' storage at 45° C. in a sealed container, 92%.

This application is a continuation-in-part of my copending application Serial No. 438,302, filed June 21, 1954, now abandoned.

The foregoing detailed description has been given for clearness of understanding only and no unnecessary limitations are to be understood therefrom. The invention is not limited to the exact details shown and described for obvious modifications will occur to those skilled in the art.

I claim:

1. A method for improving the stability of a water soluble polysaccharide xanthate having a water content less than about 10% by weight which comprises mixing said polysaccharide xanthate with at least 5% of its weight of a solid particulate non-acid desiccant to obtain an intimate mixture of said materials in pulverulent form.

2. A pulverulent solid composition containing a polysaccharide xanthate in admixture with at least 5% of its weight of a solid particulate non-acid desiccant.

3. A pulverulent solid composition containing a water soluble polysaccharide xanthate in admixture with at least 5% of its weight of a solid particulate non-acid desiccant.

4. A pulverulent solid composition containing a water soluble cellulose xanthate in admixture with at least 5% of its weight of a solid particulate non-acid desiccant.

5. A composition of claim 4 in which the desiccant is an alkaline earth metal oxide.

6. A composition of claim 5 in which the alkaline earth metal oxide is calcium oxide.

7. A composition of claim 5 in which the alkaline earth metal oxide is barium oxide.

8. A composition of claim 4 in which the desiccant is potassium carbonate.

9. A composition of claim 4 in which the desiccant is a dehydrated zeolite.

10. A composition of claim 9 in which the dehydrated zeolite is a synthetic crystalline sodium zeolite.

11. A composition of claim 9 in which the dehydrated zeolite is a synthetic crystalline calcium zeolite.

References Cited in the file of this patent

UNITED STATES PATENTS

| | | |
|---|---|---|
| 789,176 | Smith | May 9, 1905 |
| 1,074,881 | Lyncke | Oct. 7, 1913 |
| 1,880,041 | Richter et al. | Sept. 27, 1932 |
| 2,051,051 | Lilienfeld | Aug. 18, 1936 |
| 2,054,300 | Richter | Sept. 15, 1936 |
| 2,629,493 | Brown | Feb. 24, 1953 |
| 2,761,247 | Meadows | Sept. 4, 1956 |
| 2,805,119 | Studer | Sept. 3, 1957 |